United States Patent
Yang et al.

(10) Patent No.: US 9,096,722 B2
(45) Date of Patent: Aug. 4, 2015

(54) METHOD FOR CURING STRUCTURES USING A DUAL PHOTOINITIATOR SYSTEM AND A STRUCTURE MADE USING THE SAME

(71) Applicant: HRL Laboratories, LLC, Malibu, CA (US)

(72) Inventors: Sophia S. Yang, Los Angeles, CA (US); Alan J. Jacobsen, Woodland Hills, CA (US); Jacob M. Hundley, Los Angeles, CA (US); Eric C. Clough, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/255,623

(22) Filed: Apr. 17, 2014

(65) Prior Publication Data

US 2015/0111979 A1 Apr. 23, 2015

Related U.S. Application Data

(60) Provisional application No. 61/893,001, filed on Oct. 18, 2013.

(51) Int. Cl.

| | |
|---|---|
| C08F 2/50 | (2006.01) |
| C08F 2/46 | (2006.01) |
| A61L 2/08 | (2006.01) |
| A61L 24/00 | (2006.01) |
| C08G 61/04 | (2006.01) |
| C08G 75/14 | (2006.01) |
| C08F 38/00 | (2006.01) |
| C08F 16/12 | (2006.01) |
| C08F 20/10 | (2006.01) |
| C08F 20/54 | (2006.01) |
| C08F 26/06 | (2006.01) |
| C08F 36/02 | (2006.01) |
| C08G 61/02 | (2006.01) |

(52) U.S. Cl.
CPC ............... *C08G 75/14* (2013.01); *C08F 16/12* (2013.01); *C08F 20/10* (2013.01); *C08F 20/54* (2013.01); *C08F 26/06* (2013.01); *C08F 36/02* (2013.01); *C08F 38/00* (2013.01); *C08G 61/02* (2013.01)

(58) Field of Classification Search
USPC ......... 522/15, 12, 7, 6, 71, 189, 184, 1, 8, 13, 522/21, 22; 520/1
See application file for complete search history.

(56) References Cited

U.S. PATENT DOCUMENTS

| | | |
|---|---|---|
| 8,017,193 B1 | 9/2011 | Zhou et al. |
| 2003/0077059 A1* | 4/2003 | Chien et al. ................. 385/128 |
| 2007/0037895 A1* | 2/2007 | Moens et al. ..................... 522/6 |
| 2007/0066698 A1 | 3/2007 | Yang et al. |
| 2012/0138223 A1 | 6/2012 | Fang et al. |
| 2014/0035202 A1* | 2/2014 | Southwell et al. ............ 264/401 |

OTHER PUBLICATIONS

International Search Report and Written Opinion for International Application No. PCT/US2014/061423, dated Jan. 30, 2015, 10 pgs.
Duarte-Quiroga, Reyna A. et al., "Optical characterization and applications of a dual-cure photopolymerizable system," Applied Optics, 2003, vol. 42, No. 8, pp. 1417-1425.
Kuebler, Stephen M. et al., "Optimizing two-photon initiators and exposure conditions for three-dimensional lithographic microfabrication," Journal of Photopolymer Science and Technology, 2001, vol. 14, No. 4, pp. 657-668, See abstract, and pp. 657-660.

* cited by examiner

*Primary Examiner* — Ling Choi
*Assistant Examiner* — Jessica E Whiteley
(74) *Attorney, Agent, or Firm* — Christie, Parker & Hale, LLP

(57) ABSTRACT

A monomeric formulation for fabrication of microlattice structures, the monomeric formulation including a plurality of monomers, a first photoinitiator configured to substantially activate above a wavelength of light, and a second photoinitiator configured not to substantially activate above the wavelength of light and to substantially activate below the wavelength of light.

21 Claims, 6 Drawing Sheets

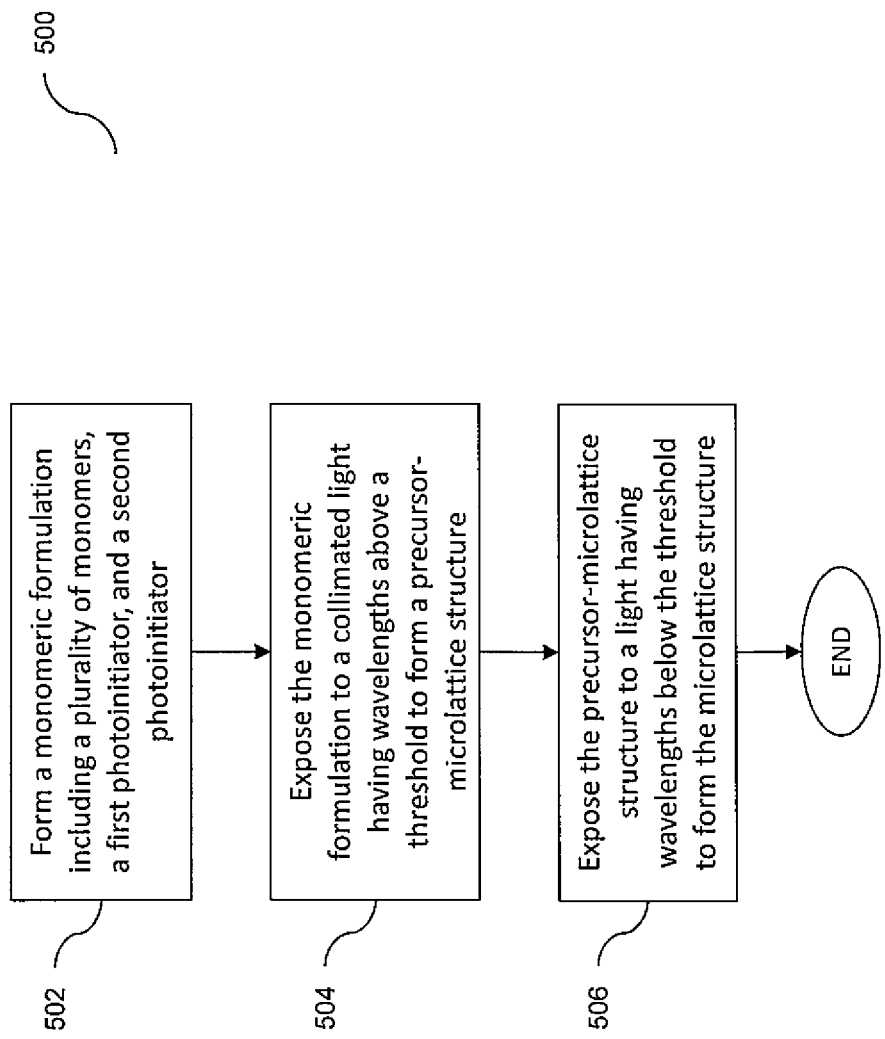

METHOD FOR CURING STRUCTURES USING A DUAL PHOTOINITIATOR SYSTEM AND A STRUCTURE MADE USING THE SAME

CROSS-REFERENCE TO RELATED APPLICATION(S)

This application claims priority to and the benefit of U.S. Patent Application No. 61/893,001, filed on Oct. 18, 2013, the entire content of which is incorporated herein by reference.

This application is related to a U.S. patent application entitled "Net-Shape Structure with Micro-Truss Core" (U.S. application Ser. No. 13/312,952), filed on Dec. 6, 2011, is related to a U.S. patent entitled "Functionally Graded Three-Dimensional Ordered Open-Cellular Microstructure and Method of Making the Same" (U.S. Pat. No. 8,195,023), issued on Jun. 5, 2012, and is also related to a U.S. patent entitled "Optically Oriented Three-Dimensional Polymer Microstructures" (U.S. Pat. No. 7,653,279), issued on Jan. 6, 2010, the entire contents of which are incorporated herein by reference.

FIELD OF THE INVENTION

The present invention relates to methods for curing structures in a net shape, and, more particularly, to methods for curing the structure utilizing a dual photoinitiator system, and to structures produced thereby.

BACKGROUND

Lightweight sandwich structures, that is, structures including a core sandwiched between two facesheets, are utilized for a variety of purposes including heat exchangers, padding (e.g., in seats, cushions, helmets, shoe insoles, mattresses, etc.), advanced armor applications (e.g., blast protection), high impact/low weight applications (such as bumper beams, battery trays, wings), and/or the like. In some applications, it may be beneficial to shape lightweight sandwich structures into particular curvatures that conform to a surface where the structure will be utilized. In some instances, framing a sandwich structure into a particular shape may require costly manufacturing techniques.

Generally, the materials utilized for lightweight sandwich structures dictate how the structure is formed and whether it can be formed to have complex curvatures. Existing materials utilized as cores for lightweight sandwich structures include foams, honeycomb, and metal lattice structures. Each of these materials has limitations in its ability to conform to particular curvatures.

Foams can be either open-cellular or closed cellular and are available in a variety of materials including, but not limited to, polymers, metals, and ceramics. Open-cellular foams generally have limited strength and stiffness, which limits their usefulness in a variety of applications. Open-cellular foams also have tortuous, non-uniform paths for fluid flow, in which high pressures are often utilized to force fluid through the structure. Closed-cellular foams have greater strength and rigidity than open-cellular foams, making them more suitable as cores for sandwich structures. However, closed-cellular foams do not permit fluid to freely flow through the material, which limits their usefulness in applications where fluid flow is required, such as heat transfer applications. Generally, machining is utilized to form foam into a particular curvature.

Honeycomb structures are also available in a number of different materials including, but not limited to, aluminum, and thermoplastic polymers. Generally, honeycomb structures are closed-cellular. In order to achieve a particular curvature with a honeycomb structure a specific corresponding unit cell shape is generally utilized. This approach may work for a structure requiring a single radius of curvature; however, it is less effective for complex curvatures which have more than one radius of curvature.

Metallic lattice structures have good strength and stiffness properties and may also function as fluid heat exchanges because the structures allow low pressure drop fluid flow through the material. However, to form a metal lattice structure into a particular curvature, the structure is generally plastically deformed or machined.

As such, what is desired is a lightweight structure that can be easily formed to have a particular curvature without resorting to pre- or post-production manufacturing, which may be time consuming, expensive, and/or may damage the structural integrity of the sandwich structure.

SUMMARY

Aspects of embodiments of the present invention are directed to curing structures in net shape by utilizing a combination of different photoinitiators and different wavelength light sources.

Aspects of embodiments of the present invention are directed toward forming and curing a microlattice structure by forming a compliant (e.g., pliable) precursor structure through activating a first photoinitiator of a resin formulation by a light (e.g., ultraviolet (UV) light) of a first wavelength and first intensity, shaping the precursor structure, if desired, and post-curing the precursor structure through activating a second photoinitiator of the resin formulation by a light (e.g., UV light) of a second wavelength and a second intensity, where the second wavelength is shorter than the first wavelength and the second intensity is greater than the first intensity.

According to embodiments of the present preset invention, there is provide a monomeric formulation for fabrication of microlattice structures, the monomeric formulation including: a plurality of monomers; a first photoinitiator configured to substantially activate above a wavelength of light; and a second photoinitiator configured not to substantially activate above the wavelength of light and to substantially activate below the wavelength of light.

In an embodiment, the first photoinitiator has a high light absorbance above the wavelength of light and the second photoinitiator has a low light absorbance above the wavelength of light and has a high light absorbance below the wavelength of light.

In an embodiment, wavelength is about 320 nm.

In an embodiment, a concentration of the second photoinitiator in the monomeric formulation is greater than that of the first photoinitiator.

In an embodiment, the first photoinitiator is about 0.025% by weight of the monomeric formulation.

In an embodiment, the first photoinitiator is about 0.01% to about 0.1% by weight of the monomeric formulation.

In an embodiment, second photoinitiator is from about 0.1% to about 1% by weight of the monomeric formulation.

In an embodiment, the plurality of monomers comprise compounds selected from the group consisting of an ethynyl, a cyanide, a vinyl ether, a vinyl ester, a vinyl amides, a vinyl triazine, a vinyl isocyanurate, an acrylate, a methacrylate, a diene, a triene, an epoxy, and a thiol.

In an embodiment, the plurality of monomers include compounds selected from the group consisting of pentaerythritol tetraacrylate; 2,4,6-triallyloxy-1,3,5-triazine; triallyl-1,3,5-triazine-2,4,6-trione; and tricyclohexane.

In an embodiment, the first photoinitiator includes a compound selected from the group consisting of a phosphine oxide, a bis acyl phosphine oxide (BAPO), a α-hydroxyketone, and a mono acyl phosphine (MAPO).

In an embodiment, the first photoinitiator includes a compound selected from the group consisting of 2,4,6-trimethyl benzoyl; 2-Hydroxy-2-methyl-1-phenyl-1-propanone; and diphenyl(2,4,6-trimethylbenzoyl)-phosphine oxide.

In an embodiment, the second photoinitiator includes a compound selected from the group consisting of α-hydroxyketone, iodonium salt, and a phenylglyoxylate.

In an embodiment, the second photoinitiator includes a compound selected from the group consisting of 1-hydroxy-cyclohexyl-phenyl-ketone; 2-hydroxy-2-methyl-1-phenyl-1-propanone; 2-hydroxy-1-[4-(2-hydroxyethoxy)phenyl]-2-methyl-1propanone; oxy-phenyl-acetic acid 2-[2 oxo-2 phenyl-acetoxy-ethoxy]-ethyl ester; oxy-phenyl-acetic 2-[2-hydroxy-ethoxy]-ethyl ester; iodonium; (4-methylphenyl)[4-(2-methylpropyl)phenyl]-; and hexafluorophosphate(1-).

According to embodiments of the present preset invention, there is provide a microlattice structure including: a plurality of struts interconnected at a plurality of nodes, the struts including a derivative of a first photoinitiator and a derivative of a second photoinitiator, wherein the first photoinitiator is configured to substantially activate above a wavelength of light, and wherein the second photoinitiator is configured not to substantially activate above the wavelength of light and to substantially activate below the wavelength of light.

In an embodiment, the first photoinitiator has a high light absorbance above the wavelength of light, and wherein the second photoinitiator has a low light absorbance above the wavelength of light and has a high light absorbance below the wavelength of light.

In an embodiment, the wavelength is about 320 nm.

In an embodiment, a diameter of each of the plurality of struts is between about 10 μm to about 10 mm.

In an embodiment, a separation between adjacent nodes of the plurality of nodes is between 2 to 20 times a diameter of a strut of the plurality of struts.

According to embodiments of the present preset invention, there is provide a method for forming a microlattice structure, the method including: forming a monomeric formulation including a plurality of monomers, a first photoinitiator, and a second photoinitiator; exposing the monomeric formulation to a collimated light to form a precursor-microlattice structure, the collimated light having wavelengths above a threshold value; and exposing the precursor-microlattice structure to a light having wavelengths below the threshold value to form the microlattice structure.

In an embodiment, the precursor-microlattice structure is a partially cured structure.

In an embodiment, the microlattice structure is a rigid structure.

In an embodiment, the microlattice structure is a compliant structure.

In an embodiment, the method further includes deforming the partially-cured microlattice structure into a desired shape before exposing the partially-cured microlattice structure to the light having wavelengths below the threshold value.

In an embodiment, the threshold value is about 320 nm.

In an embodiment, an intensity of the light having wavelengths below the threshold value is greater than that of the collimated light.

In an embodiment, the light having wavelengths below the threshold value is a non-collimated light.

In an embodiment, the exposing of the precursor-microlattice structure includes fixing the precursor-microlattice structure in a green state into the microlattice structure in a substantially cured state.

BRIEF DESCRIPTION OF THE DRAWINGS

These and other features and advantages of the present invention will be better understood by reference to the following detailed description when considered in conjunction with the following drawings, in which like elements are referenced with like numerals. These drawings should not be construed as limiting the present invention, but are intended to be illustrative only.

FIG. 5 is a flow diagram of a process for curing microlattice materials by utilizing the dual cure system, according to an illustrative embodiment of the present invention.

DETAILED DESCRIPTION

Figure 1:
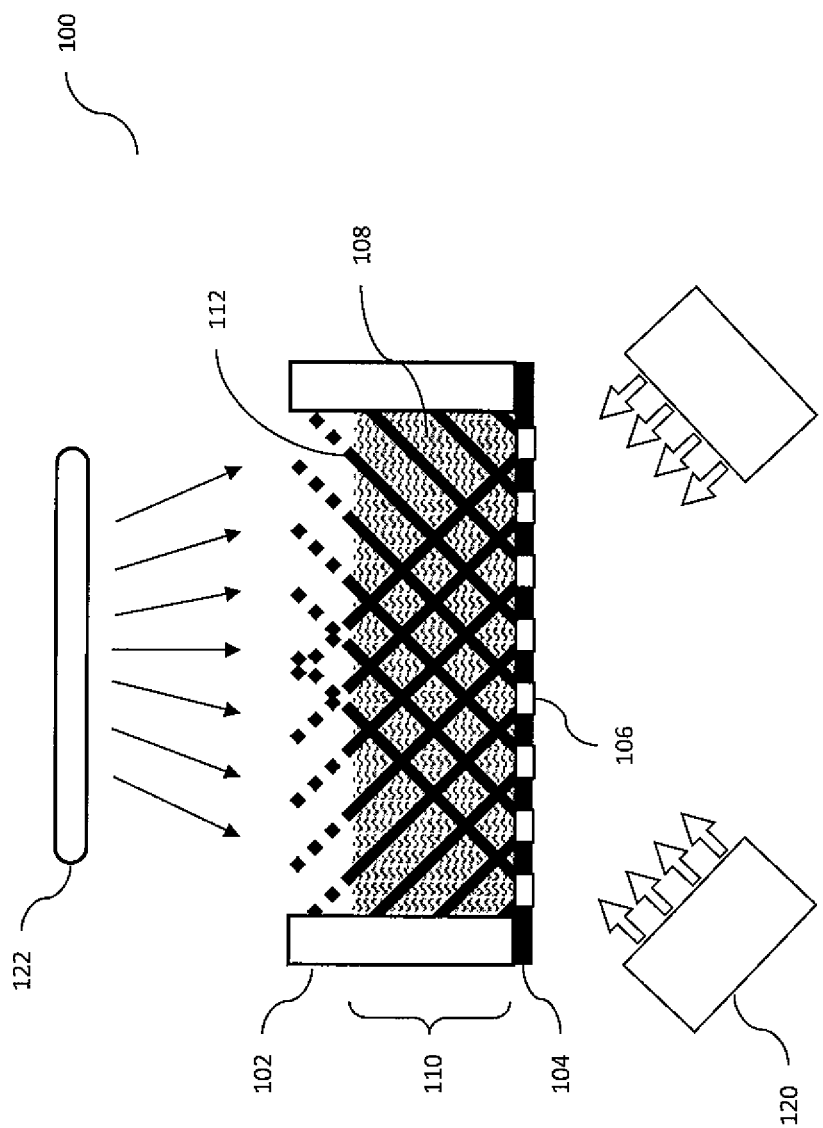
FIG. 1 is a schematic cross-sectional diagram illustrating a dual photoinitiator system (e.g., a dual cure system) for forming a three-dimensional structure, according to an illustrative embodiment of the present invention.

The detailed description set forth below in connection with the appended drawings is intended as a description of illustrative embodiments of a system and method for manufacture of a heat exchanger in accordance with the present invention, and is not intended to represent the only forms in which the present invention may be implemented or utilized. The description sets forth the features of the present invention in connection with the illustrated embodiments. It is to be understood, however, that the sane or equivalent functions and structures may be accomplished by different embodiments that are also intended to be encompassed within the spirit and scope of the present invention. As denoted elsewhere herein, like element numbers are intended to indicate like elements or features. As used herein, the term "substantially," "about," and similar terms are used as terms of approximation and not as terms of degree, and are intended to account for the inherent deviations in measured or calculated values that would be recognized by those of ordinary skill in the art. Moreover, the acts described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or components may also be present therebetween.

The present invention relates to methods for forming and curing structures in a net shape utilizing a dual photoinitiator system, and to example structures produced thereby.

In free-radical light-cured systems, it is desired to ensure that a high degree of crosslinking occurs in the final polymer structure to prevent extractables from leeching out. For thin film applications, this may be solved by utilizing a high percentage of photoinitiator in the resin formulation. However, for thicker polymer applications, adding more photoinitiator may not be desirable, as the photoinitiator absorbs light (e.g., ultraviolet (UV) light), preventing deeper curing. As such, in applications that require deep penetration of light into a photomonomer resin, such as the fabrication of microlattice materials with polymer waveguides, longer wavelength light (e.g., light having a wavelength higher than a threshold) as well as photoinitiators active in these regions may be preferred for curing. In an embodiment, as a result of, utilizing lower intensity light of a long wavelength, the formed structure is not fully cross-linked and is in a compliant (e.g., pliable) or "green" state. This flexible structure may then be shaped, if desired, and further cured (e.g., fully cured) under higher intensity light of a shorter wavelength (e.g., light having a wavelength lower than a threshold). In an embodiment, in order to fully post-cure (e.g., UV post-cure) the structure with a higher intensity, shorter wavelength light, a second photoinitiator that is active in the shorter wavelengths is added to the photomonomer resin. This combination of two different photoinitiators provides the ability to form the microlattice material, shape the structure, and then further cure the polymer with a blanket exposure at shorter wavelengths.

FIG. 1 is a schematic cross-sectional diagram illustrating a dual photoinitiator (e.g., a dual cure) system 100 for forming a three-dimensional (3D) structure, according to an illustrative embodiment of the present invention.

The 3D structure 110 may be created utilizing a single collimated beam or multiple collimated beams passing through a patterning apparatus (e.g., a mask) 104 located at one or more sides of a reservoir (e.g., molding chamber) 102 having (or containing) a resin formulation (e.g., a photomonomer resin) 108 that polymerizes at a first wavelength of collimated light beams emitted by first light sources 120. The patterning apparatus 104 may include multiple apertures (e.g., gaps or openings) 106. Each of the apertures 106 has a given shape and dimension that defines (e.g., substantially matches) a cross-sectional geometry of a strut (e.g. waveguide) 112 that constitutes the 3D structure 110.

In an embodiment, the mask 104 may rest on a transparent substrate (or transparent plate) that forms a side (e.g., the bottom side) of the reservoir 102. In another embodiment, the transparent substrate acts as the mask 104, for example, portions of the transparent substrate are opaque while other portions are transparent to the light of the first light sources 120. In one embodiment, different thicknesses of microlattice structures may be achieved by filling the reservoir 102 with photomonomer resin 108 to a desired height. Once the collimated light is applied, the intersecting polymer waveguides 112 grow from the surface of the mask 104 (or the surface of the transparent substrate), terminating at the free (e.g., upper) surface of the photomonomer resin 108 in the reservoir 102 to form the grown waveguides (e.g., struts) 112 of the microlattice structure 110. The intersecting polymer waveguides 112 polymerize, thus forming a 3D structure (e.g., a precursor-microlattice structure or network) 110. In an example, the intersecting waveguides 112 may have a diameter (e.g., thickness) of about 10 µm to about 10 mm, and may intersect at nodes that may be distanced apart by about 2 to about 20 times the node diameter.

According to an embodiment, the precursor-microlattice structure 110 may be shaped as desired and then further cured (e.g., post-cured or surface cured) by exposing the structure to a light exposure (e.g., blanket exposure) from the second light source (e.g., lamp) 122. In an embodiment, the precursor structure 110 is separated (e.g., removed) from the remaining resin formulation 108 before exposure to the second light source 122, which may be positioned, relative to the precursor structure 110, in any suitable manner that ensures exposure of the entire (or nearly all of) the precursor structure 110 to the light from lamp 122. For example, the exposure may occur from the top down, as illustrated in FIG. 1.

As recognized by a person of ordinary skill in the art to which this invention pertains, alterations and changes in the described precursor structure 110 and the method of forming the precursor structure 110 by activating a photoinitiator via long-wavelength collimated light can be practiced without meaningfully departing from the principles, spirit, and scope of this invention, as set forth herein.

According to an embodiment, the resin formulation 108 includes monomers (e.g., oligomers), a first photoinitiator, and a second photoinitiator. The first photoinitiator has a high light absorption above a threshold wavelength (e.g., 320 nm) and the second photoinitiator has high absorption below the threshold wavelength and little to no absorption above the threshold.

Figure 2A:
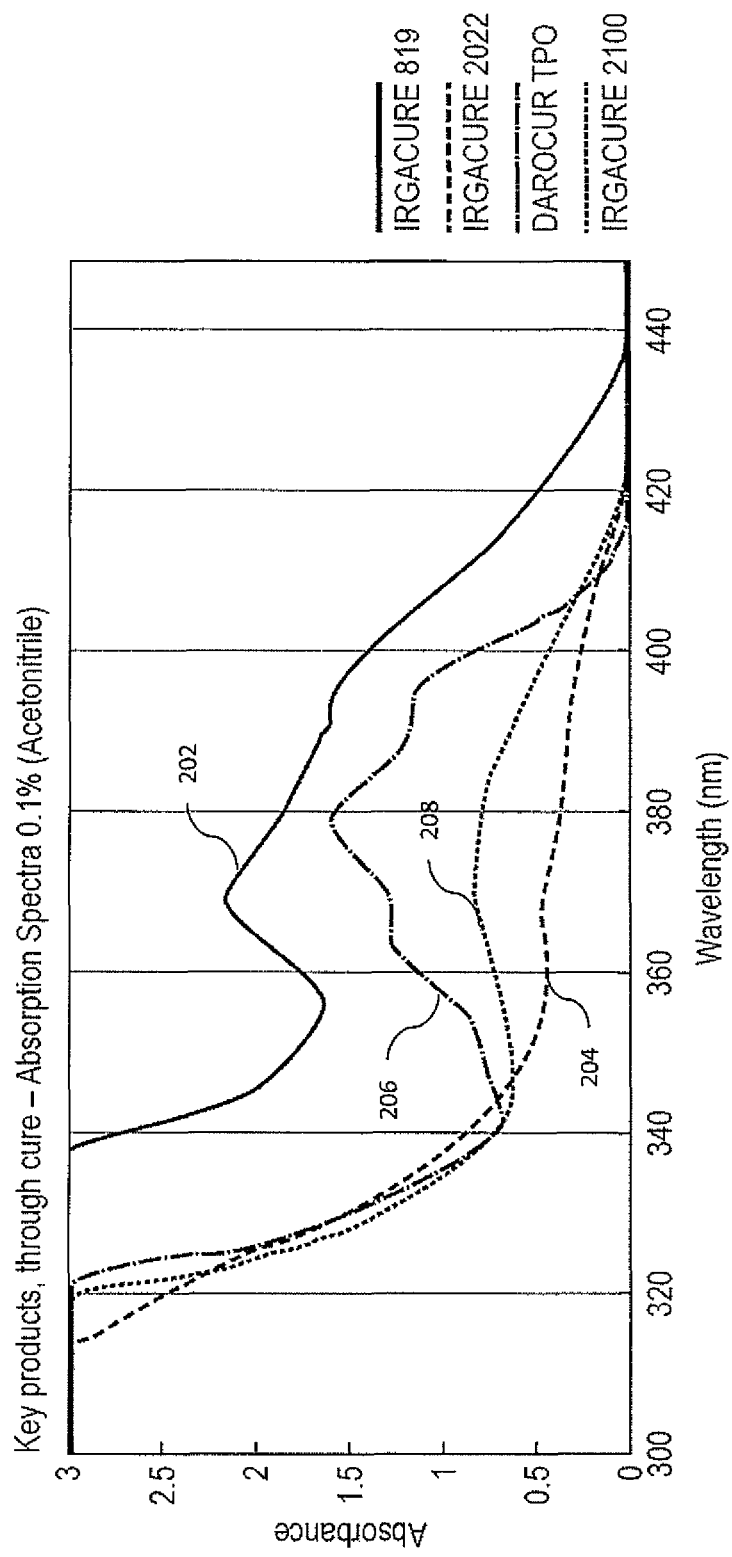
FIG. 2A illustrates the UV absorption spectra of example photoinitiators that are active at longer wavelengths utilized as the first photoinitiators of the resin formulation, according to an illustrative embodiment of the present invention.
Figure 2B:
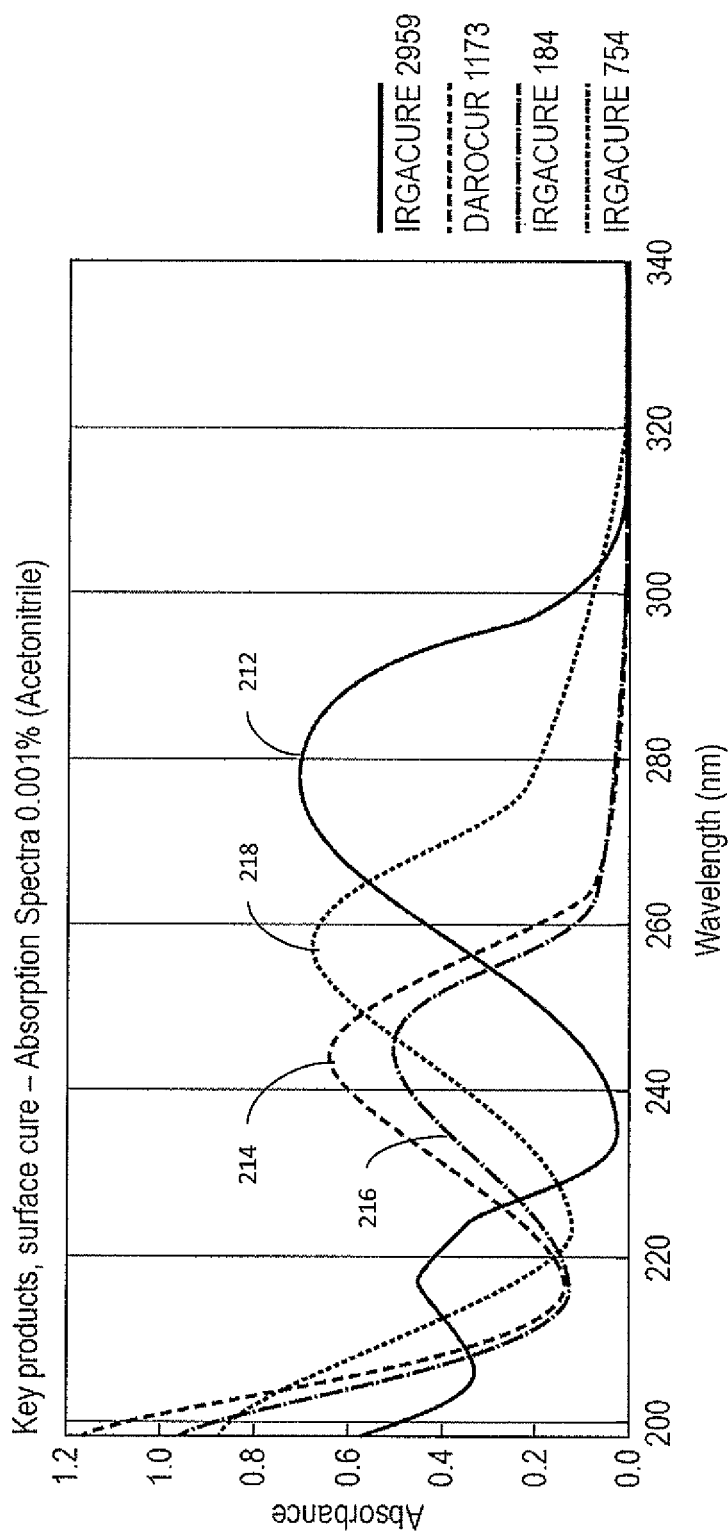
FIG. 2B illustrates the UV absorption spectra of example photoinitiators that are active at shorter wavelengths utilized as the second photoinitiators of the resin formulation, according to an illustrative embodiment of the present invention.

FIG. 2A illustrates the UV absorption spectra of example photoinitiators that are active at longer wavelengths utilized as the first photoinitiators of the resin formulation 108, according to an illustrative embodiment of the present invention. FIG. 2B illustrates the UV absorption spectra of example photoinitiators that are active at shorter wavelengths utilized as the second photoinitiators of the resin formulation 108, according to an illustrative embodiment of the present invention.

According to some embodiments, examples of first photoinitiators that absorb light at longer wavelengths include Irgacure 819, Irgacure 2022, Darocur TPO, and Irgacure 2100, which have absorption spectra represented by curves 202, 204, 206, and 208, respectively. As shown in FIG. 2A, the above-named examples exhibit high absorptions (e.g., peak absorptions) above about 360 nm.

According to some embodiments, examples of second photoinitiators that absorb at shorter wavelengths include Irgacure 2959, Irgacure 1173, Irgacure 184, and Irgacure 754, which have absorption spectra represented by curves 212, 214, 216, and 218, respectively. As shown in FIG. 2B, the above-named examples exhibit high absorptions (e.g., peak absorptions) of light below about 300 nm, and exhibit low absorbance (e.g., do not exhibit any absorbance) of light above about 320 nm.

According to an embodiment, the monomers (e.g., oligomers) of the resin formulation 108 include compounds selected from the group consisting of an ethynyl containing compound, a cyanide containing compound, a vinyl ether, a vinyl ester, a vinyl amide, a vinyl triazine, a vinyl isocyanurate, an acrylate, a methacrylate, a diene, a triene, an epoxy, and a thiol. For example, the monomers include compounds selected from the group consisting of pentaerythritol tetraacrylate; 2,4,6-triallyloxy-1,3,5-triazine; triallyl-1,3,5-triazine-2,4,6-trione; and tricyclohexane.

According to an embodiment, the first photoinitiator of the resin formulation 108 includes a compound selected from the group consisting of a phosphine oxide, a bis acyl phosphine oxide (BAPO), a α-hydroxyketone, and a mono acyl phosphine (MAPO). For example, the first photoinitiator includes a compound selected from the group consisting of 2,4,6- trimethyl benzoyl; 2-Hydroxy-2-methyl-1-phenyl-1-propanone; and diphenyl(2,4,6-trimethylbenzoyl)-phosphine oxide.

According to an embodiment, the second photoinitiator of the resin formulation 108 includes a compound selected from the group consisting of α-hydroxyketone, iodonium salt, and a phenylglyoxylate. For example, the first photoinitiator includes a compound selected from the group consisting of 1-hydroxy-cyclohexyl-phenyl-ketone; 2-hydroxy-2-methyl-1-phenyl-1-propanone; 2-hydroxy-1-[4-(2-hydroxyethoxy)phenyl]-2-methyl-1propanone; oxy-phenyl-acetic acid 2-[2 oxo-2 phenyl-acetoxy-ethoxy]-ethyl ester; oxy-phenyl-acetic 2-[2-hydroxy-ethoxy]-ethyl ester; iodonium; (4-methylphenyl)[4-(2-methylpropyl)phenyl]-; and hexafluorophosphate(1-).

According to an embodiment of the present invention, the dual cure system 100 includes a low concentration (e.g., less than 0.1% by weight) of the first photoinitiator and a high concentration (e.g., more than 0.1% by weight) of the second photoinitiator is included in the resin formulation 108. For example, the first photoinitiator may be from about 0.01% to about 0.1% by weight of the monomeric formulation (such as 0.025 weight % of the formulation), and the second photoinitiator may be from about 0.1% to about 1% by weight of the monomeric formulation.

The above combination of concentrations allow for the formation of waveguides 112 of a desired height. During an initial exposure, when the resin formulation 108 is exposed to long-wavelength light (i.e., light having wavelength higher than the threshold) from the first light source 120, the light activates (e.g., polymerizes) the first photoinitiator (and, e.g., not the second photoinitiator), however, the low concentration of the first photoinitiator allows for deep penetration of the long-wavelength light, and thus, facilitates the formation of an initial structure (e.g., a precursor structure) 110 with waveguides 112. In an embodiment, lowering the intensity of the longer wavelength light increases the penetration of light in the resin formulation 108 (e.g., increases the curation depth). As a result, the initial structure 110 may not be fully cross-linked (e.g., be in a "green" state). This flexible microlattice material can then be shaped and further cured (e.g., fully cured) with a second light exposure from the second light source 122. During a second exposure, when the resin formulation 108 is exposed (e.g., blanket exposed) to the shorter wavelength light (i.e., light having wavelength lower than the threshold), the second photo initiator is activated, thus further curing (e.g., surface curing) the polymer waveguides 112 of the initial structure 110. In an embodiment, the intensity of the shorter wavelength light is greater than the intensity of the longer wavelength light.

Figure 3:
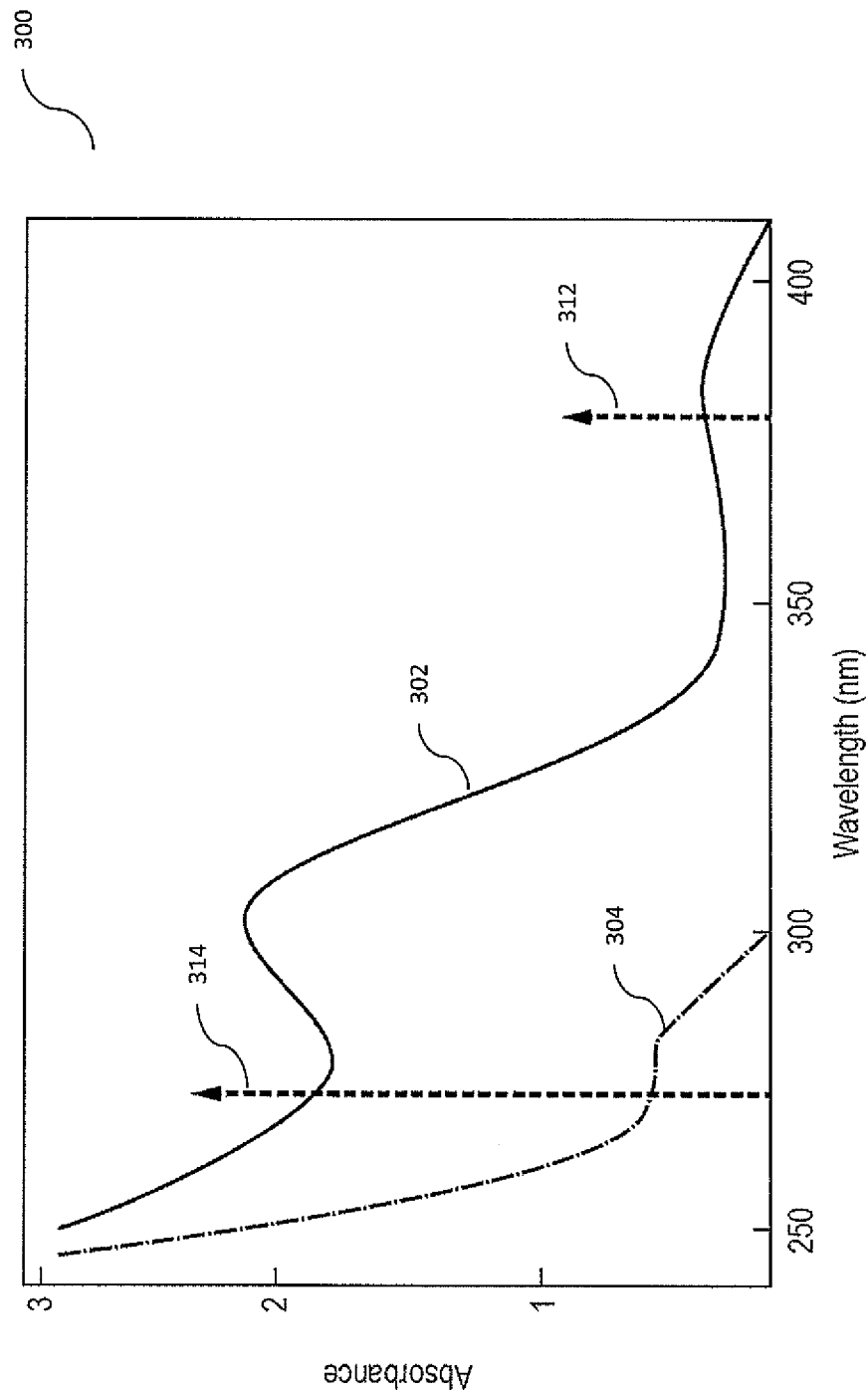
FIG. 3 illustrates the light absorption spectra of the first and second photoinitiators and the wavelengths of lights utilized during the dual curing stages of the dual photoinitiator system, according to an embodiment of the present invention.

FIG. 3 illustrates the light absorption spectra of the first and second photoinitiators and the wavelengths of lights utilized during the dual curing stages of the dual photoinitiator system 100, according to an embodiment of the present invention.

In an embodiment, the first photoinitiator, represented by the absorption curve 302, is activated by a first light 312 having a wavelength of about 385 nm, which may be produced by a UV light emitting diode (UV-LED) exposure system. The exposure allows polymer waveguide formation to occur, with exposure times ranging from, for example, about 10 seconds to about 2 minutes, depending on the architecture of the dual photoinitiator system 100. After the precursor-microlattice (e.g., the "green" microlattice) is formed, the structure may be shaped before being post-cured (e.g., UV Post-cured). In an embodiment, the second photoinitiator, represented by the absorption curve 304, is activated by a second light 314 having a wavelength of about 270 nm, which may be produced by, for example, an UV electrodeless lamp such as an "H+ bulb" manufactured by DDU Enterprises, Inc.

The duration of the post-cure (e.g., surface cure) process may depend on the intensity of the second light source 122, which, in an example, may be adjusted (e.g., tuned) by changing the distance between the precursor structure 110 and the second light source 122. In some examples, the post-cure time may range from seconds to minutes. In an embodiment, increasing the concentration of the second photoinitiator and/or increasing the intensity of the second light 314 shortens the post-cure time and/or yields a more rigid microlattice structure.

A desirable feature of the dual cure system 100 is that the precursor-microlattice material 110 is in a compliant state (e.g., a pliable or "green" state) after the initial structure formation, which allows the initial structure 110 to be shaped before finally setting during a post-cure phase. The precursor-microlattice undergoing a shaping process may be unconstrained or constrained (e.g., bonded to a facesheet).

Figure 4A:
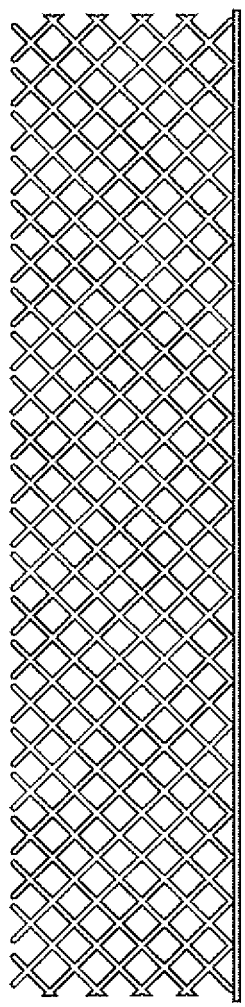
FIGS. 4A-4B respectively illustrate a cross-section of a flat unconstrained microlattice structure, and one that is shaped utilizing a method of net-shaping, according to an illustrative embodiment of the present invention.
Figure 4B:
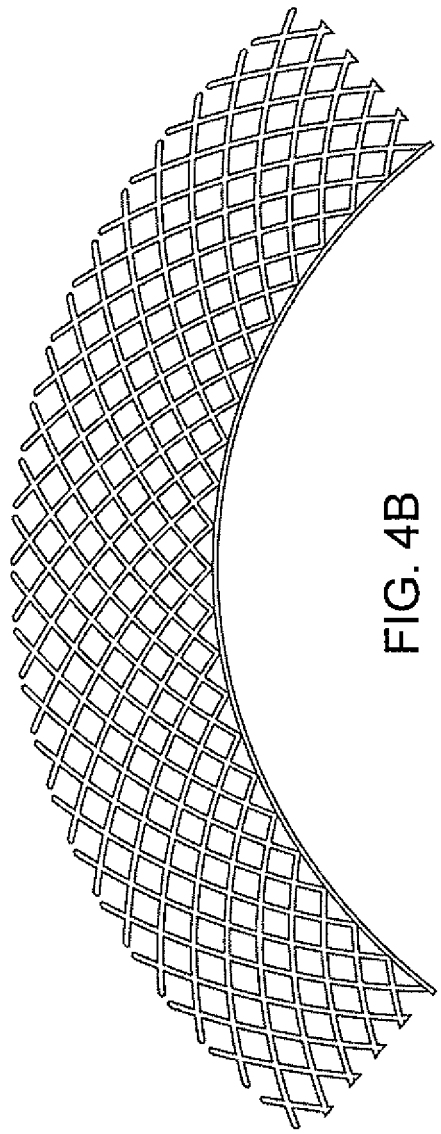

In an example, a method for shaping unconstrained microlattice structures may include shaping the precursor structure (e.g., net shape) 110 by hand; twisting or bending the precursor structure 110 and fixing it in place with bolts, pins, clamps, transparent film, and/or the like; curving or bending the precursor structure (e.g., the flat structure) 110 over, into, and/or around a mold or mandrel; and/or a similar method. FIGS. 4A-4B illustrate, respectively, a cross-section of a flat unconstrained microlattice structure, and one that is shaped utilizing the example method described above.

In an example, a method for shaping a constrained microlattice structure includes, for example, utilizing a mold and edge clamping the piece (e.g., curving the bonded facesheet over the mold so the open surface is exposed to the shorter wavelength light); utilizing a mold while applying suction and/or a magnetic field (i.e., if the facesheet is ferromagnetic) to the facesheet, and exposing the open surface to the shorter wavelength light of the second light source 122; utilizing a vacuum-bag (or other deformable membrane) that is transparent to the shorter wavelength light in conjunction with a mold, a vacuum-bag, and/or a matched tool; pressing a preshaped facesheet (e.g., a thermoformed, a stamped, an extruded facesheet) flat in a mold tool, exposing the resin formation 108 to the longer wavelength light to form the precursor-microlattice 110, removing the precursor-microlattice 110 from the mold, and, after the sheet springs back into shape, post curing utilizing the shorter wavelength light; and/or utilizing a preformed (ex. thermoformed, stamped, extruded, etc.) facesheet that is transparent to the shorter and longer wavelength lights as a mold tool, and exposing the resin formulation 108 first to the longer wavelength light and then to the shorter wavelength light through the transparent facesheet (in an example, the formed precursor-microlattice may directly bond to the preformed facesheet during the post-cure process); and/or a similar method.

In the above and other examples of net-shaping, one constraint on how the material can be shaped and cured is that at least one surface of the precursor-structure 110 be transparent to the shorter wavelength light.

FIG. 5 is a flow diagram of a process 500 for curing microlattice materials by utilizing the dual cure system 100, according to an illustrative embodiment of the present invention.

At act 502, the monomeric formulation 108 is formed, which includes a plurality of monomers and/or oligomers, a first photoinitiator, and a second photoinitiator. In one embodiment, the concentration of the second photoinitiator in the monomeric formulation 108 is greater than that of the first photoinitiator. For example, the first photoinitiator may be less than about 0.1% by weight of the monomeric formulation 108, whereas the second photoinitiator may be from about 0.1% to about 0.5% by weight of the monomeric formulation.

At act 504, the monomeric formulation 108 is exposed to a collimated light having wavelengths above a threshold value to form a precursor-microlattice structure (e.g., a partially-cured microlattice structure) 110. In an embodiment, the threshold value is about 320 nm. The wavelength threshold may be selected such that the first photoinitiator has a high light absorbance above the threshold, while the second photoinitiator has a low light absorbance above the threshold and has a high light absorbance below the threshold. In one example, the formed precursor-microlattice structure 110 is a partially cured structure. According to an embodiment, at act 504, after forming the precursor-microlattice structure 110, the partially-cured structure is deformed into a desired shape.

At act 506, the precursor-microlattice structure 110 is exposed to a light having wavelengths below the threshold value to form the microlattice structure (e.g., the post-cured microlattice structure) 110. In an embodiment, the light having wavelengths below the threshold value is a non-collimated light and may have an intensity that is greater than that of the collimated light utilized at act 502. According to an embodiment, at act 506, the precursor-microlattice structure 110 that is in a green state is fixed into the microlattice structure in a substantially cured state. In an example, the post-cured microlattice structure is a rigid (e.g., hard or not easily deformable) structure. In another example, the post-cured microlattice structure is a compliant (e.g., a soft or easily deformable) structure.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A monomeric formulation for fabrication of microlattice structures, the monomeric formulation comprising:
    a plurality of monomers comprising thiol;
    a first photoinitiator configured to substantially activate above a wavelength of light; and
    a second photoinitiator configured not to substantially activate above the wavelength of light and to substantially activate below the wavelength of light,
    wherein a concentration of the second photoinitiator in the monomeric formulation is greater than that of the first photoinitiator, the first photoinitiator being about 0.01% to about 0.1% by weight of the monomeric formulation, and the second photoinitiator being about 0.1% to about 1% by weight of the monomeric formulation.

2. The monomeric formulation of claim 1, wherein the first photoinitiator has a high light absorbance above the wavelength of light and the second photoinitiator has a low light absorbance above the wavelength of light and has a high light absorbance below the wavelength of light.

3. The monomeric formulation of claim 1, wherein the wavelength is about 320 nm.

4. The monomeric formulation of claim 1, wherein the plurality of monomers further comprise compounds selected from the group consisting of an ethynyl, a cyanide, a vinyl ether, a vinyl ester, a vinyl amides, a vinyl triazine, a vinyl isocyanurate, an acrylate, a methacrylate, a diene, a triene, and an epoxy.

5. The monomeric formulation of claim 1, wherein the plurality of monomers comprise compounds selected from the group consisting of pentaerythritol tetraacrylate; 2,4,6-triallyloxy-1,3,5-triazine; triallyl-1,3,5-triazine-2,4,6-trione; and tricyclohexane.

6. The monomeric formulation of claim 1, wherein the first photoinitiator comprises a compound selected from the group consisting of a phosphine oxide, a bis acyl phosphine oxide (BAPO), a α-hydroxyketone, and a mono acyl phosphine (MAPO).

7. The monomeric formulation of claim 1, wherein the first photoinitiator comprises a compound selected from the group consisting of 2,4,6-trimethyl benzoyl; 2-Hydroxy-2-methyl-1-phenyl-1-propanone; and diphenyl(2,4,6-trimethylbenzoyl)-phosphine oxide.

8. The monomeric formulation of claim 1, wherein the second photoinitiator comprises a compound selected from the group consisting of α-hydroxyketone, iodonium salt, and a phenylglyoxylate.

9. The monomeric formulation of claim 1, wherein the second photoinitiator comprises a compound selected from the group consisting of 1-hydroxycyclohexyl-phenyl-ketone; 2-hydroxy-2-methyl-1-phenyl-1-propanone; 2-hydroxy-1-[4-(2-hydroxyethoxy)phenyl]-2-methyl-1 propanone; oxyphenyl-acetic acid 2-[2 oxo-2 phenyl-acetoxy-ethoxy]-ethyl ester; oxy-phenyl-acetic 2-[2-hydroxy-ethoxy]-ethyl ester; iodonium; (4-methylphenyl)[4-(2-methylpropyl)phenyl]-; and hexafluorophosphate(1-).

10. A microlattice structure comprising:
    a plurality of struts interconnected at a plurality of nodes, the struts comprising a derivative of a first photoinitiator in a monomeric formulation and a derivative of a second photoinitiator in the monomeric formulation,
    wherein the first photoinitiator is configured to substantially activate above a wavelength of light,
    wherein the second photoinitiator is configured not to substantially activate above the wavelength of light and to substantially activate below the wavelength of light, and
    wherein a concentration of the second photoinitiator in the monomeric formulation is greater than that of the first photoinitiator, the first photoinitiator being about 0.01% to about 0.1% by weight of the monomeric formulation, and the second photoinitiator being about 0.1% to about 1% by weight of the monomeric formulation.

11. The microlattice structure of claim 10,
    wherein the first photoinitiator has a high light absorbance above the wavelength of light, and
    wherein the second photoinitiator has a low light absorbance above the wavelength of light and has a high light absorbance below the wavelength of light.

12. The microlattice structure of claim 10, wherein the wavelength is about 320 nm.

13. The microlattice structure of claim 10,
    wherein a diameter of each of the plurality of struts is between about 10 μm to about 10 mm, and
    wherein a separation between adjacent nodes of the plurality of nodes is between 2 to 20 times a diameter of a strut of the plurality of struts.

14. A method for forming a microlattice structure, the method comprising:
    forming a monomeric formulation comprising a plurality of monomers, a first photoinitiator, and a second photoinitiator;

exposing the monomeric formulation to a collimated light to form a precursor-microlattice structure, the collimated light having wavelengths above a threshold value;

exposing the precursor-microlattice structure to a light having wavelengths below the threshold value to form the microlattice structure; and wherein a concentration of the second photoinitiator in the monomeric formulation is greater than that of the first photoinitiator, the first photoinitiator being about 0.01% to about 0.1% by weight of the monomeric formulation, and the second photoinitiator being about 0.1% to about 1% by weight of the monomeric formulation.

15. The method of claim 14, wherein the precursor-microlattice structure is a partially cured structure.

16. The method of claim 14, wherein the microlattice structure is a rigid structure.

17. The method of claim 14, wherein the microlattice structure is a compliant structure.

18. The method of claim 16, further comprising deforming the partially cured structure into a desired shape before exposing the partially cured structure to the light having wavelengths below the threshold value, wherein the deforming comprises one or more of curving, compressing, twisting, stretching, constraining at various points, bending, and shaping to fit into a space, so that the partially cured structure changes geometry into a different final shape.

19. The method of claim 14, wherein an intensity of the light having wavelengths below the threshold value is greater than that of the collimated light.

20. The method of claim 14, wherein the light having wavelengths below the threshold value is a non-collimated light.

21. The method of claim 14, wherein the exposing of the precursor-microlattice structure comprises fixing the precursor-microlattice structure in a green state into the microlattice structure in a substantially cured state.

\* \* \* \* \*